(12) United States Patent
Barrett

(10) Patent No.: US 6,813,450 B2
(45) Date of Patent: Nov. 2, 2004

(54) SYSTEMS AND METHODS FOR DEVICE DEGRADATION DETERMINATION AND RESOLUTION BY EVENT OCCURRENCE RECORDATION AND TIMING ANALYSIS

(75) Inventor: Tony Barrett, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 10/164,132

(22) Filed: Jun. 4, 2002

(65) Prior Publication Data

US 2003/0231332 A1 Dec. 18, 2003

(51) Int. Cl.$^7$ ............................................. G03G 15/00
(52) U.S. Cl. ............................ 399/9; 399/18; 399/21
(58) Field of Search .................................. 399/9, 18, 21, 399/42, 16, 24, 31, 8–11; 358/296, 434–438, 439; 395/12–14

(56) References Cited

U.S. PATENT DOCUMENTS

| | | | |
|---|---|---|---|
| 5,027,135 A | | 6/1991 | Negishi et al. |
| 5,408,589 A | | 4/1995 | Yamamoto |
| 5,424,808 A | * | 6/1995 | Maekawa et al. ............. 399/18 |
| 5,444,524 A | * | 8/1995 | Lee .............................. 399/18 |
| 5,528,347 A | * | 6/1996 | Kamath et al. ............... 399/18 |
| 5,768,495 A | | 6/1998 | Campbell et al. |
| 5,831,744 A | * | 11/1998 | Kataoka ..................... 358/296 |
| 5,887,216 A | | 3/1999 | Motoyama |
| 5,930,463 A | | 7/1999 | Park |
| 5,949,553 A | * | 9/1999 | Iimori ........................ 358/444 |
| 5,960,228 A | * | 9/1999 | Budnik et al. ................. 399/8 |
| 6,535,698 B2 | * | 3/2003 | Horikoshi ..................... 399/16 |

* cited by examiner

Primary Examiner—Hoan Tran

(57) ABSTRACT

A method and apparatus for determining the cause of degradation in a product or device. A reference time is established and recorded, then a process or function of the device or product is enabled. As anomalous events occur, a user actuates an actuator that causes the recordation of an event time with respect to the reference time. Events may be repetitive or non-repetitive. At completion of the function, the recorded times are compared to a table of known product or device cycle function times, and a correlation is made to determine the most likely cycle function related to the events recorded. This information can then be correlated to parts previously known to operate at such times thereby providing a diagnostic tool useful in maintenance or repair of the device or product.

9 Claims, 2 Drawing Sheets

SYSTEMS AND METHODS FOR DEVICE DEGRADATION DETERMINATION AND RESOLUTION BY EVENT OCCURRENCE RECORDATION AND TIMING ANALYSIS

BACKGROUND OF THE INVENTION

1. Field of the Invention

The present invention relates to apparatus and methods for identifying product performance faults. More specifically, the present invention relates to apparatus and methods for identifying and resolving device performance faults in printers, copiers and other media processing apparatus.

2. Description of the Related Art

Many products are assembled from a complex array of components that interact mechanically and electrically to accomplish one or more functions. Frequently, the individual functions are further subdivided into a plurality of sub-functions or cycles. Naturally, a complex product may be subject to defects in materials and workmanship, normal wear, degradation, improper service, abuse, and consumption such that peak design performance cannot usually be maintained over the life of the product. All these factors contribute to general product degradation over time, which can occur gradually or suddenly. However, degradation does not necessarily imply total failure of the product, as the effects of degradation frequently manifest themselves as gradually reduced product performance, increased noise, changes in appearance and sound, increased consumption and so forth. It is common for a user to notice the degradation, in fact such notice is frequently an indicator to a user that there is a present need to service a product.

When a user has noticed one or more events related to the performance of a product that are indicative of reduced product performance, such information can be used in an attempt to isolate and resolve the problem. For example, the user may refer to an owner/operator manual's troubleshooting section to locate a table of symptoms, causes and effects to identify the problem at the root of a given set of symptoms. Similarly, the user may contact a service provider to request service for the product and at the same time relay to the service provider the events or symptoms that indicate to the user that service is needed. In fact, the nature of the events that are indicative of a need for service, are similarly useful to identify a particular problem and point to an appropriate service requirement.

An example of a product that fits the foregoing model is the computer laser printer. While there are a great range of sizes, capacities and features respecting laser printers, they are all similar in that each is a complex electromechanical device. Laser printers generally include paper feed trays, paper feed and registration mechanisms, image drums, developers, transfer belts, fusers, paper output feed mechanisms, collators, output paper trays and many other components. Motor driven belts and rollers are typically used to move paper through the printing process. Frequently, gears are used to maintain alignment and timing of rollers. Springs are employed to maintain pressure and alignment of components. A variety of sensors are usually disposed within a laser printer to establish the location and control the timing of movement of the paper as it passes through the printer. Some sensors are provided for the purpose of detecting faults, such as jams and some are used to detect and report consumable levels, track page counts and et cetera. While laser printers are generally designed for quiet operation, a certain level of mechanical sound is currently unavoidable in operation of a laser printer.

As components wear, are consumed, or otherwise degrade in performance, the sounds and characteristics of the laser printer change. For example, a clunking sound may develop. A repetitive squeaking sound may develop or perhaps a rubbing or scratching sound. Perhaps a visual queue will develop, such as the paper beginning to pull out of alignment at a particular time in the printing cycle. The paper jamming in the same place during each printing or collating cycle is another example. A trouble indicator lamp on the printer may illuminate at a particular time during the printing cycle. These are the kinds of events that lead a user to question the performance of the product. These are also the kinds of indications that are useful in troubleshooting the product, either by the user or by service personnel.

Some of the aforementioned events indicative of degradation in performance are intermittent. Intermittent events indicative of degradation are problematic from a service point of view. A user may place a call for service and the service personnel may make a site visit to effect the needed repair, only to find that the symptom has vanished during the time it took to arrive on the service call. This may be frustrating and costly as the service technician is often unable to duplicate the symptom. Consequently, service may require more time or a second service call at a later date.

Those trained in repair of laser printers or other electro-mechanical devices appreciate the value of experiencing first hand and considering the aforementioned events indicative of degradation in performance while attempting diagnosis and service of a device. These individuals often value the subtle information that is present when the event characteristics are considered in view of the product itself. For example, a sound that occurs each instance that a new sheet of paper is fed into the printer is more likely to indicate a problem in the input feed mechanism than it is in the output feed subsystem. Similarly, a repetitive sound that occurs much more frequently than the image drum operating cycle period is not likely to result from the operation of the image drum. It would more likely result from a faster operating transfer roller, such as one that has an operation cycle of equal duration. Whether a certain function of the printer is enabled or not, such as a page duplexer or a collating feeder, is useful in determining whether or not that portion of the device ought to be studied in the fault investigation process. Device faults can be isolated by the time events occur, the frequency with which they occur, whether a particular function is presently enabled, as well as other timing related events.

Thus there is a need in the art for an apparatus and/or method for gathering and analyzing event information indicative of degradation in performance of a product.

SUMMARY OF THE INVENTION

The need in the art is addressed by the apparatus and methods of the present invention by which process event information is utilized as a diagnostic tool. The apparatus includes a mechanism for starting a process of the apparatus and a detector that operates to establish a time reference based on a predetermined action within the process. Also, a controller is included with a memory, coupled to the detector, which operates to store event times with respect to the time reference for events in the process.

In accordance with the inventive method, process event information in a product is utilized for diagnosing defects, degradation and malfunctions. The method includes the steps of starting a process of the product and establishing a time reference according to a predetermined action within the process. Then, a first event time is stored with respect to the time reference for at least a first event in the process. This information is used for subsequent diagnosis.

In a refinement of the foregoing method, the storing step is executed upon actuation of an actuator by a user. The storing step may be accomplished by remote actuation, such as through network communication. Further, the storing step may be executed multiple times for an event that repeats periodically. The inventive method also includes the steps of determining a time period between the multiple times stored for the event and then correlating the period to previously determined process periodic event timing information. In a further refinement, the method includes the step of correlating the stored event times to previously determined process event timing information. The previously determined process event timing information includes related problem description information and the method includes the step of outputting at least a first problem description related to the correlated stored event time information. The inventive method includes the optional steps of displaying the stored event time information and printing the stored event time information. In a further refinement, the method includes the step of communicating the stored event time information to a remote location. Also, the starting step may be initiated from a remote location. The method further includes the step of diagnosing a product malfunction with reference to the stored event time information.

DESCRIPTION OF THE INVENTION

Figure 1:
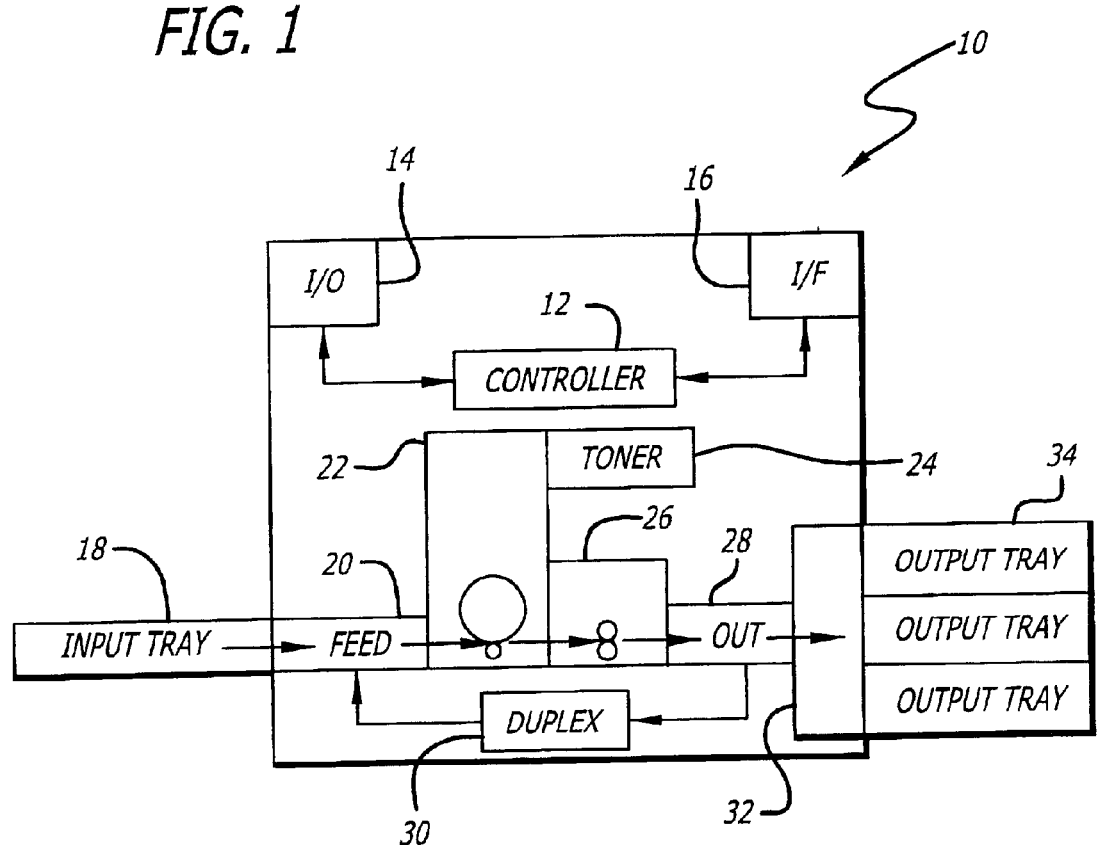
FIG. 1 is a functional block diagram of an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

An illustrative embodiment of the present invention is directed to a laser printer product. A laser printer is an electromechanical device that performs multiple processes to accomplish the ultimate output of printed media in an orderly fashion. The processes include media feeding, printing, duplexing, collating, and others. Each of these processes involves actions taken over time through utilization of mechanical components operated by a complex control system. Such a control system employs numerous sensors and other components in conjunction with a software driven controller. While the illustrative embodiment is directed to a laser printer, the teachings of the present invention are readily applicable to many other devices and products that are characterized by the operation of a process over time and suffer from some degree of gradual degradation in performance, however manifested. As the performance of such devices degrades, various operating characteristics also change. Such operating characteristic changes are manifested as aural, visual and tactile cues that differ from those present in a new or properly operating device. In the case of the illustrative laser printer, these cues include the aforementioned sounds and indications. Noticing changes in the operating characteristics of a device or product and recording such changes for analysis is central to the advantageous teachings of the present invention. When these changes become susceptible to notice and monitoring, they become potentially valuable diagnostic indices. The present invention teaches a novel approach to capturing information about these changes and then teaches how to utilize such information in a diagnostic process. Operating characteristics, cues and changes in performance that are perceptible to a user or service technician are referred to hereinafter as an "event" or "events".

Precise knowledge of when and how often an event occurs is often useful information that can help isolate the root cause of a problem during a diagnostic procedure. Events such as an abnormal sound, a paper jam, completed page release, and blinking indicator are examples of useful event information. The occurrence of an event, in combination with the relative timing to other events, is particularly useful. The combination of event occurrences and relative timing is frequently indicative of what corrective action is appropriate to resolve the service issue at hand. Components such as gears, shafts, belts, reciprocating parts and other parts in a printer have unique operating periods or frequencies that produce characteristic event clues as to their identity. For example, if an event repeats at a given frequency and it is known that a certain part also operates at that frequency, then there is a high likelihood that that certain part is at fault. Not all operations in a laser printer are periodic. Some parts function just a single time or at non-periodic intervals in a printing operation. Some parts operate only when a particular sub-process is employed. These parts therefore produce non-periodic events. In the case of events that are non-periodic, there is still useful diagnostic information available, if the relative time at which such events occurs is known.

For example, consider the operation of a duplexer or collator in a laser printer. The operation of these sub-systems occurs only when a user selects those functions. If the duplexer, for example, has degraded and thus produces a characteristic sound (an event), it is useful to know that the duplexer was enabled and at what point in a printing operation the suspect event occurred. If the event occurred at a time that the duplexer was known to be operating, then the event is indicative of the likelihood of a fault in the duplexer. It is also significant to note that the speed at which a device or product operates is pertinent to the advantages of the present invention.

In the case of a printer that produces just a few pages per minute, it can be rather obvious to a service technician what process is active as the machine operates. However, the trend in technological advancements is toward an increase in speed and this has certainly been the case for laser printer technology. A modern laser printer operates at a speed that makes it difficult to ascertain which functions are in operation at any given instant. Therefore, the recordation of events and the timing of events are even more beneficial as device operating speed increases. Once recorded, the event and timing relationships can be correlated to known data at a relatively leisurely pace not otherwise possible during the real-time operation of the machine. The present invention teaches an apparatus and method for finely resolving the timing relationship of events in the operation of a laser printer or other machine.

Reference is directed to FIG. 1, which is a functional block diagram of an illustrative embodiment of a laser printer 10 implemented in accordance with the teachings of the present invention. The teachings of the present invention are implemented in the controller 12 of the laser printer 10. An input tray 18 holds a supply of paper for use in subsequent printing jobs. A feed mechanism 20 operates to extract each sheet of paper from the input tray 18 as printing operations are initiated. Printing operation can be initiated either locally through actuation of an actuator on an input/output control panel 14 or by command received from another computing device, or over a network, through an interface 16 in the printer 10. In any case, the controller 12 receives a print command, as well as the data to be printed, and begins a printing operation by commanding the feed mechanism 20 to extract a sheet of paper from the feed tray 18. The laser printer 10 has numerous sensors (not shown) that are positioned throughout the printer and that are generally located along the path that the paper traverses as it is printed. Such sensors have been applied in prior art printers and additional sensors can be added for the purpose of implementing the present invention. Various kinds of sensors can be utilized, as are understood by those skilled in the art. Examples of suitable sensors are optical position sensors, mechanical position sensors, thermal sensors, electrical contacts, machine vision sensors, and other sensor technologies as well. Thus, the controller 12 is not only coupled to actuate motors, solenoids, and other electromechanical devices within the printer 10, the controller is also coupled to receive inputs from various sensors. The controller 12 receives inputs from various sensors that indicate, for example, the position of the paper, the presence of a paper jam, low levels of consumables such as toner, over temperature conditions, and so forth. Because this information is available to the controller, occurrences of events can be correlated to sensory input information, which aides in resolving what operations are active at the time events occur.

According to the present invention, it is advantageous to establish a timing reference point prior to making event time measurements so that the moment of a subsequent or a precedent event can be correlated to that timing reference point. An exemplary approach to establishing a timing reference point is to utilize an optical sensor in the feed mechanism 20 that goes active as each piece of paper first traverses the feed mechanism 20. Later event timing points can then be referenced to the paper feed reference point, thereby enabling a precise determination of the moment each event occurs. Those skilled in the art will appreciate that many other reference points could readily be selected. The present invention does not limit the system to a single timing reference point. Secondary timing reference points could be established for each separate process that the printer performs. For example, the beginning of the duplexing and collating operations could be used as the timing reference points for those operations. The controller 12 comprises a timer or clock (not shown) that is used to mark time. Initially, the controller 12 marks and saves one or more reference times in a memory (not shown) and then it marks and saves event times as they are entered. The entry of event times will be more fully discussed hereinafter. In summary, the illustrative embodiment laser printer marks a timing reference event, which is used as a reference point for all other event timing measurements. While it was known in the prior art to utilize event occurrences in fault diagnosis procedures, prior art timing measurements were made using various unrelated reference points that introduced ambiguity and uncertainly into the diagnostic process.

Again referring to FIG. 1, the feed mechanism 20 transports a sheet of paper to the image transfer drum 22. As is understood by those skilled in the art, the transfer drum 22 has the image to be printed impressed upon it directly by a laser and developer combination or indirectly through an intermediate image transfer drum. Toner is taken from a toner cartridge 24 and transferred to the drum 22 using electrostatic force. The drum 22 rotates to transfer the image to the paper. Gears, pulleys, belts, shafts and other mechanical components rotate or otherwise move to guide the paper though the printing path. Various printer components are likewise moved or rotated in synchronous therewith. The speeds and periods of movement of the various components typically differ from one another. After passing through the transfer drum 22, the paper is moved to a fuser 26, which applies heat and pressure to fix the toner to the paper. An output feed mechanism 28 receives the paper from the fuser 26 and delivers it to a collator 32. If the collator is enabled, it delivers the sheet, or sheets, of paper to one or more designated output trays 34. In addition, the illustrative embodiment laser printer 10, comprises a duplexing mechanism 30, which enables printing on both sides of a given sheet of paper. If the duplexer 30 is enabled, the sheet of paper is received from the output feed 28 and is reversed and delivered to the feed mechanism 20 for subsequent printing to the reverse side.

In the illustrative implementation in a laser printer, a software diagnostic tool is implemented in the existing controller 12 of the laser printer 10. In particular, executable code resides in a memory in controller 12. This diagnostic tool is available for use by untrained end users as well as trained service technicians. The diagnostic tool is accessible either locally or by remote access. Remote access can be achieved with wired or wireless connection via direct connection or over a public or private network.

The diagnostic function operates as follows. The printer begins, for example, making an intermittent squeaking sound (a series of events) that repeat at a periodic rate. The sounds are noticed as a series of abnormal events, which lead the user to believe that degradation has occurred and that there is a problem that requires service. The user, or service technician, enables the diagnostic tool (either locally or remotely through the interface 16 or by other means of interface) and then initiates a printing job through actuation of a printing command. The software automatically starts a timer with respect to the aforementioned timing reference point. At each occurrence of the event (the squeak) the user actuates a designated actuator on the input/output panel 14. Alternatively, a key on a connected computing device could be used as the actuator. In the case where the access occurs remotely via a network connection, a telephonic connection is used to allow the user to hear the squeak and to allow the actuation of an actuator to mark the events as they occur. At each actuation, which is synchronized with the event occurrences, the controller 12 stores the time reference in a memory. Thus, a series of timed events are recorded for later analysis.

The period between events is determined by averaging the time duration between the plural event times or by utilizing a combination of rounding and subtraction techniques. The periods determined are compared to a table of reference periods that can be stored locally within the printer or at a remote service location. If the timing information is stored locally, the determined period is compared with the reference period in the controller 12 memory by the user. If the reference periods are stored remotely, either the determined period can be transmitted to the remote location or the reference periods can be transmitted to the printer location. Either the user or service technician can perform this function. The remote access transmission can be accomplished via the Internet or other telecommunications technology as will be appreciated by those skilled in the art.

It is to be understood that predetermined or theoretical data used for comparison with the determined periods need not be stored in a connected device. The reference information can be published on labels, in service manuals, on the Internet, or otherwise distributed to users and service technicians. It may also be useful for the printer controller 12 to build a table of actual diagnostic data in its memory. The table results from data collected during test operations. The data can then be displayed, printed, or transmitted elsewhere for analysis by comparison to reference data that would reside elsewhere as well. In this way, as new discoveries are made about the content of the data and the nature of the failures related to the data, the diagnostic value can be enhanced long after the design of the printer has been completed. The reference data, which is essentially tabulated metrics of printer performance, can be characterized according to the performance of a typical unit in real world applications. As more data is gathered over time, the reference data can be updated to reflect actual operating conditions. By allowing the reference data tables to be updated, other changes in the product evolution can be addressed. For example, if there is a software version change, a suitable reference table can be created for each software version.

The reference table also includes entries that identify specific components in the laser printer that have periods or frequencies of operation consistent with a particular table line entry. Such information is provided by the supplier of the printer (whether that is a manufacturer, distributor, service center or other entity having technical capabilities respecting the printer) and comprises a list of periods related to each component that operate repetitively. The information also includes data for each of the various known operating periods or frequencies pertinent to the particular printer. Thus, the periods determined by timing events in the diagnostic process are correlated to the list of reference periods in the aforementioned reference table. This correlation is used to narrow the list of possible offending components in the printer. The information can be further correlated to a reference list of components known to be operating at the time a particular function is being analyzed, such as when the duplexer or collator is operating. The correlation thus provides the period and/or the list of faulty components to the user or service technician. The form of output can be any that are understood by those skilled in the art, including but not limited to, writing the information to a display on the printer, coupling it through an interface to another computing device, printing it, or coupling it through a telephone line or network to a remote location.

In addition to diagnosis of repetitive events, non-repetitive events can be captured and diagnosed as well. For example, if an unusual squeak occurs once each time a printing operation is processed, the user initiates the diagnostic procedure and runs a test print cycle. The user running the test actuates a designated actuator at the moment the sound (the event) is heard. A software diagnostic routine located in the printer controller, or elsewhere, builds a table of timing values relative to the reference starting point. The table may be built with one or more event entries. A new table entry is created each time the designated actuator is actuated (or other action taken). The table of timing information can be viewed on the printer control panel, printed on a page, or sent as a file over the network to a remote location for further analysis. In addition, the table can include relative and absolute timing column entries, which can be correlated with specific printer cycle operations. Examples of specific printer cycle operations are picking first page, registering first page, transferring first page, fusing first page, first page entering the duplexer entry sensor, and so forth. Some of the reference events may be entered into the table automatically by via software and some reference events may be manually selected by the user or service technician.

Absolute event timing information is useful for diagnosing non-repetitive events and relative event timing information is useful for diagnosing repetitive events. In addition to absolute and relative timing information, a frequency (or period) column can be included in the data table. If the squeak (or other event) occurs once per second, the frequency is 1 Hz. This implies that components that normally operate at higher or lower frequencies would most likely not be related to the problem. Perhaps the squeak is only heard when the mechanism is under load. Analysis of the timing information helps determine the root cause of various printer problems. The actuator actuations are gathered and stored in a table and marked with timing information that is referenced to a designated reference point. After the data is gathered and inserted into the table, it is compared to reference data previously gathered that indicates known printer cycle function timing relationships. The gathered event times can then be correlated to known timing relationships, thereby indicating the more likely printer functions that are involved with the anomalous event. The functions are correlated to specific components that enable each function. At the end of the correlation, the actual event times may be output, the specific printer cycle functions can be output or the list of pertinent components can be output from the process. This information can be presented in various forms, including but not limited to, a text listing, a table of alpha-numeric characters arranged in tabular format, a graphical representation, and output, such as by display on the printer control panel, printed on a page, sent to a file on a PC, on the network, on the Internet, or other forms as are understood by those skilled in the art. By comparing the timing information collected by the diagnostic routines described by this inventions to tables of timing information developed during product design or developed at some other time, problems can be quickly and accurately isolated. A graphical representation of the actual recorded event timing data could be shown proximate to graphs representing nominal acceptable timing windows to aid diagnosis. For example a graphic representing actual paper sensor activity could be aligned near one showing the theoretical or empirical earliest and latest expected transition times. If a sensor was toggling outside the nominal timing windows this could be a very useful diagnostic clue.

Figure 2:
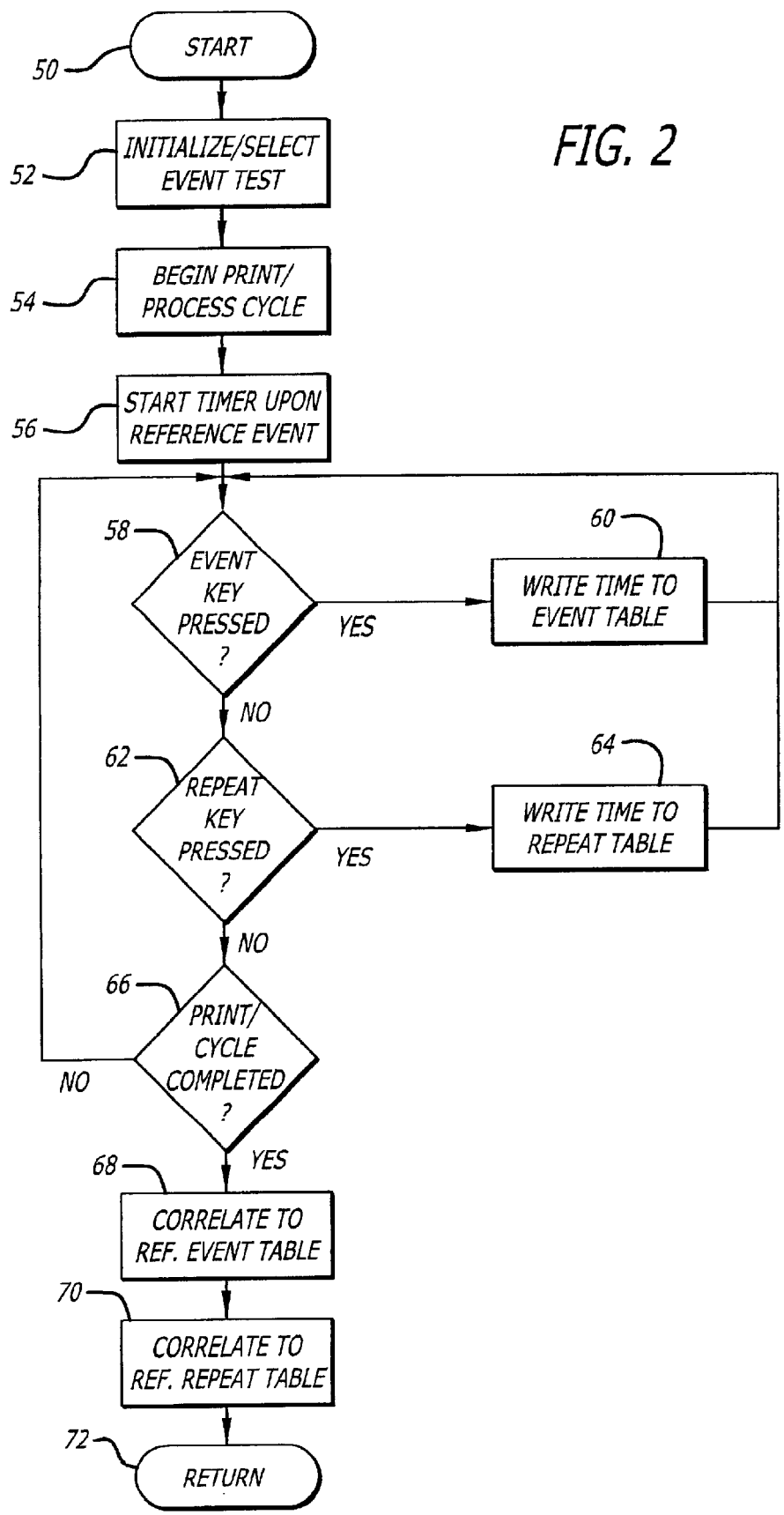
FIG. 2 is a flow diagram of an illustrative embodiment of the present invention.

Reference is directed to FIG. 2, which is a process flow diagram of an illustrative embodiment of the present invention. The process begins when called from another routine at step 50 and then proceeds to step 52 where the event test function is selected and initialized. For example, the basic print function could be tested or the test could specify that the collator or duplexer function be included. This selection is useful to enable the process to take the suitable reference time measurements. In addition, part of the initialization sequence at step 52 could be to either clear the event table memory, or to put a marker in the table, such as a page count or time stamp, to delineate the latest set of event data from previously recorded event tests. At step 54, the print or other process cycle is begun. This can occur either automatically or manually through actuation of a key or on command from another computing device. At step 56, the controller takes the reference time measurement by detecting that the appropriate printer sensor has gone active and begins a timer in anticipation of subsequent event actuations. The start timer reference event function at step 56 may also be prospective. For example, the time reference may be the completion of the transfer operation of the transfer drum in the printer. This may occur in time after an event occurs, such as an abnormal sound in the paper feed mechanism. In this case, actuation of an event key, described below, may occur before the start event. A prospective event is accounted for by employing a negative time measurement which covers events occurring before the start as negative time duration and events that occur after the start as positive time duration.

At step 58, a test is made to determine whether a key has been pressed, which is the aforementioned actuation of an actuator. If a key has been pressed, flow continues at step 60 where the event time is written to an event table. Flow then recirculates to step 58 for detection of another event. On the other hand, at step 58, if no key has been pressed, flow continues to steps 62, which conducts a repeat key pressed test. Those skilled in the art will appreciate that the repeat key function may be embodied in a single actuator with the event key function. A smart keypad algorithm, understood by those skilled in the art can readily accomplish this duality of function. Step 62 is the test used in the case where the selected function is being used to isolate a periodic event. Therefore, step 62 would not be useful for a non-periodic event. If a repeat key is present, the time is written to the table at step 64, however it is written as a periodic event; with reference to the first occurrence that was previously captured at step 58 and 60. Thus, at step 64, the table is filled with periodic times used for later determination of the average period of periodic events.

On the other hand, at step 62, if no repeat key has been pressed, flow continues to step 66 where a test is conducted to determine if the print or other printer cycle operation has been completed. If it has not, flow recirculates to step 58 to form a test loop that reiterates until the print operation or cycle is completed.

It is to be appreciated that the process flow regarding steps 58 through 64 relate to an illustrative embodiment and that other embodiments fall within the scope of the present invention. For example, those having ordinary skill in the art will appreciate that a single actuator can readily be implemented that provides both of the individual and repetitive event noting functions. In fact, the gathering and analysis of the event timing information can be used to determine when and if any event is repetitive or not based upon the periods between a series of events. That is, rather than denoting key actuations as repetitive events at the time events are entered, the event timing information is merely entered and marked for time. The data is later analyzed to identify periodic events.

If the print operation or cycle is completed, or terminated by other means, at or before step 66, then flow continues to step 68 where the event time information gathered is correlated to previously stored tables of printer cycle function timing data. At this step, the time periods between the aforementioned reference times and the printer function cycle times are compared. If two or more durations closely match, it is inferred that the event that induced the user to press the key is correlated to the print cycle functions that occurred closely in time. This is a good indicator and leads to the identity of the part or parts in operation for the associated printer cycle function. Next, at step 70, the same correlation function is accomplished as that at step 68, but for repetitive functions. First, at step 70, the controller calculates the period between timing events and then compares this period to previously stored periods related to printer cycle functions. If a close match in time is found, it provides an indication that the parts in the printer that operate at that period, or frequency, are more likely to be the offending parts that need repair. At step 72 the process returns to the calling step, which outputs the information as discussed herein before.

It is to be appreciated that the present invention advances the art of device and product fault diagnosis, detection, problem isolation and resolution. The improvements include quicker fault isolation and more precise fault isolation. Having access to the teachings herein, users and service technicians may be more likely to fully understand the nature of a problem earlier in the diagnostic process. This permits more rapid corrective action with less chance of replacement of unrelated parts that are not a cause of the problem.

The present invention provides additional data to facilitate more accurate prediction of which parts to dispatch to the user's location, thereby improving the first time fix rate while reducing the number of parts incorrectly dispatched. As a result, repair and distribution costs are reduced. Device or product down-time is also reduced. Time needed to make the required repair is reduced as well. Multiple site visits for a single repair effort are reduced, usually to a single visit. The coordination of service personnel with parts distribution is enhanced. The present invention places an accurate and easy to use tool in the hands of the end user that can be utilized to capture events in the case of an intermittent problem. The information is also made available at a later time when a trained service technician arrives, whether the problem is intermittent or not.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

What is claimed is:

1. An apparatus operable to utilize process event information, comprising:

a means for starting a process of the apparatus;

a detector operable to establish a time reference based on a predetermined action within said process;

a controller with a memory, coupled to said detector and operable to capture at least a first event time with respect to said time reference for at least a first event in said process; and an actuator coupled to said controller, wherein said controller captures and stores a plurality of times in said memory for an event that repeats periodically, said controller being operable to determine a period between said plurality of times stored in said memory for said event that repeats periodically and to correlate said period to previously determined process periodic event timing information stored in said memory.

2. The apparatus of claim 1 further comprising an actuator coupled to said controller, wherein said controller stores said captured time event in said memory upon actuation of said actuator.

3. The apparatus of claim 1 wherein said controller is operable to correlate said first event time stored in said memory to previously determined process event timing information stored in said memory.

4. The apparatus of claim 3 wherein said previously determined process event timing information includes related problem description information, wherein said controller is operable to output at least a first problem description related to said correlated stored event time information.

5. The apparatus of claim 1 further comprising a display coupled to said controller, wherein said controller is operable to display said stored event time information on said display.

6. The apparatus of claim 1 further comprising a communications port coupled to said controller, wherein said controller is operable to communicate said stored event time information to a remote location through said communications port.

7. A printer operable to utilize printing event information, comprising:

a first actuator for starting a printing process;

a detector operable to detect a predetermined action within the printer;

a memory;

a controller coupled to said first actuator and operable to start said printing process upon actuation thereof;

said controller coupled to said detector and operable to establish a time reference upon detection of said predetermined action;

said controller coupled to said memory and operable to read and write data therebetween;

a second actuator coupled to said memory, wherein said controller is operable to store a corresponding event time with respect to said time reference for each actuation of said second actuator; and a third actuator coupled to said controller, wherein said controller stores a plurality of related times in said memory each corresponding to repetitive actuations of said third actuator, said controller being operable to determine a period between said plurality of related times stored in said memory and to correlate said period to previously determined process periodic event timing information stored in said memory.

8. The printer of claim 7 wherein said controller is operable to correlate said event times stored in said memory to previously determined process event timing information that is related to problem description information, wherein said controller is operable to output at least a first problem description related to said correlated stored event time information.

9. The printer of claim 8 further comprising a display coupled to said controller, wherein said controller is operable to display said information or said description on said display.

* * * * *